US012595177B2

(12) United States Patent (10) Patent No.: US 12,595,177 B2

Arima et al. (45) Date of Patent: Apr. 7, 2026

(54) CARBONACEOUS MATERIAL FOR ELECTROCHEMICAL DEVICE, PRODUCTION METHOD THEREFOR, NEGATIVE ELECTRODE FOR ELECTROCHEMICAL DEVICE, AND ELECTROCHEMICAL DEVICE

(71) Applicant: KURARAY CO., LTD., Kurashiki (JP)

(72) Inventors: Junichi Arima, Bizen (JP); Yasuyuki Hirota, Bizen (JP); Akinori Yamabata, Bizen (JP); Taketoshi Okuno, Bizen (JP)

(73) Assignee: KURARAY CO., LTD., Kurashiki (JP)

( * ) Notice: Subject to any disclaimer, the term of this patent is extended or adjusted under 35 U.S.C. 154(b) by 751 days.

(21) Appl. No.: 17/767,120

(22) PCT Filed: Oct. 6, 2020

(86) PCT No.: PCT/JP2020/037889

§ 371 (c)(1),
(2) Date: Apr. 7, 2022

(87) PCT Pub. No.: WO2021/070825

PCT Pub. Date: Apr. 15, 2021

(65) Prior Publication Data

US 2022/0371893 A1 Nov. 24, 2022

(30) Foreign Application Priority Data

Oct. 10, 2019 (JP) ................................. 2019-186982

(51) Int. Cl.
C01B 32/05 (2017.01)

(52) U.S. Cl.
CPC .......... C01B 32/05 (2017.08); *C01P 2002/72* (2013.01); *C01P 2004/61* (2013.01); *C01P 2006/12* (2013.01); *C01P 2006/40* (2013.01)

(58) Field of Classification Search
CPC .. C01B 32/05; C01P 2002/72; C01P 2004/61; C01P 2006/12; C01P 2006/40
See application file for complete search history.

(56) References Cited

U.S. PATENT DOCUMENTS

2006/0115730 A1 6/2006 Taniguchi et al.
2014/0080004 A1* 3/2014 Imaji ...................... C01B 32/05
423/445 R 2014/0377647 A1 12/2014 Nakanishi et al.
2015/0270072 A1 9/2015 Sonobe et al.
2018/0233749 A1 8/2018 Fujioka et al.
2018/0323433 A1* 11/2018 Kawakami ............ H01M 4/587
2018/0375093 A1* 12/2018 Mitra ..................... H01G 11/24
2019/0237763 A1* 8/2019 Wakizaka ............. H01M 4/587
2019/0273248 A1* 9/2019 Yamada ................ H01M 4/131

FOREIGN PATENT DOCUMENTS

JP H06-340407 A 12/1994
JP 2006185887 A 7/2006
JP 2006269961 A * 10/2006
JP 2014089887 A 5/2014
JP 2015005377 A 1/2015
JP 2017073325 A 4/2017
WO WO-2015146960 A1 * 10/2015 ............. H01M 4/62
WO WO-2017022486 A1 2/2017
WO WO-2017073687 A1 5/2017

OTHER PUBLICATIONS

Machine Translation of JP-2006269961-A (May 22, 2025) (Year: 2025).*
Machine Translation of WO-2015146960-A1 (Nov. 19, 2025) (Year: 2025).*
Extended European Search Report issued Aug. 30, 2024, in corresponding European Patent Application No. 20874256.9, 10 pages.
English translation of the International Preliminary Report on Patentability and Written Opinion issued Apr. 21, 2022 in PCT/JP2020/037889, 6 pages.
International Search Report issued Dec. 8, 2020 in PCT/JP2020/037889, 2 pages.
Ming, W., et al., "Metallurgical Processes for Tantalum and Niobium", Technical and theoretical textbooks for non-ferrous metal workers, China Nonferrous Metals Industry Corporation Employee Education Textbook Editing and Review Office, 1986 3 pages (with English translation).

* cited by examiner

*Primary Examiner* — Matthew J Merkling
(74) *Attorney, Agent, or Firm* — Element IP, PLC

(57) ABSTRACT

An object of the present invention is to provide a carbonaceous material suitable as an electrode material of an electrochemical device which is increased in capacity with not only suppression of an increase in irreversible capacity, but also securement of a high electrode density, as well as a method for producing the carbonaceous material The present invention relates to a carbonaceous material for an electrochemical device, having a specific surface area of 23 m²/g or less as measured according to a BET method and an aerated energy (AE) of 40 mJ or more and 210 mJ or less as measured with a powder rheometer.

11 Claims, No Drawings

CARBONACEOUS MATERIAL FOR ELECTROCHEMICAL DEVICE, PRODUCTION METHOD THEREFOR, NEGATIVE ELECTRODE FOR ELECTROCHEMICAL DEVICE, AND ELECTROCHEMICAL DEVICE

TECHNICAL FIELD

The present invention relates to a carbonaceous material for an electrochemical device and a production method therefor, as well as a negative electrode for an electrochemical device and an electrochemical device each containing the carbonaceous material for an electrochemical device.

BACKGROUND ART

In recent years, various electrochemical devices have been developed along with popularization of, for example, small mobile terminals such as mobile phones and laptops, and electric vehicles and hybrid vehicles. In particular, non-aqueous electrolyte secondary batteries using carbonaceous materials as negative electrodes, typified by lithium-ion secondary batteries, have grown in use, and, while have become smaller and lighter for on-board applications and the like, have been demanded to be enhanced in energy density. For example, Patent Document 1 has disclosed a carbonaceous material usable for a non-aqueous electrolyte secondary battery high in electrode density and excellent in input-output characteristics and cycle characteristics.

RELATED ART DOCUMENT

Patent Document

Patent Document 1: JP 2017-073325 A

SUMMARY OF THE INVENTION

Problems to be Solved by the Invention

However, a smaller particle size of the carbonaceous material as in Patent Document 1 leads to a larger specific surface area, and therefore a non-aqueous electrolyte secondary battery in which the carbonaceous material is applied to an electrode is easily increased in irreversible capacity and is decreased in charge-discharge efficiency, thereby leading to no sufficient enhancement in energy density. Thus, there is a need for development of a carbonaceous material suitable for obtaining an electrode for an electro-chemical device, which is low in irreversible capacity with a high electrode density being secured.

In view of the above problems, an object of the present invention is to provide a carbonaceous material suitable as an electrode material of an electrochemical device which is increased in capacity with not only suppression of an increase in irreversible capacity, but also securement of a high electrode density, as well as a method for producing the carbonaceous material.

Means for Solving the Problems

The present inventors have made intensive studies about carbonaceous materials in order to solve the above problems, and as a result, have found that it is important for not only suppression of an increase in irreversible capacity, but also securement of a high electrode density, to control the particle size of a carbonaceous material and additionally allow various factors, for example, a particle size distribution, and the shape, cohesion and fluidity of each particle to be compositely involved and then controlled in a well-balanced manner, and have found an index compositely reflecting these factors, to thereby lead to completion of the present invention.

Specifically, the present invention encompasses the following suitable aspects.

[1] A carbonaceous material for an electrochemical device, having a specific surface area of 23 $m^2/g$ or less as measured according to a BET method and an aerated energy (AE) of 40 mJ or more and 210 mJ or less as measured with a powder rheometer.

[2] The carbonaceous material according to [1], wherein an average particle size $D_{50}$ where a cumulative volume from a fine particle side in a particle size distribution measured according to a laser scattering method reaches 50% is 1 μm or more and 50 μm or less, and a particle size distribution index $D_{50}/D_{10}$ with the average particle size $D_{50}$ and a particle size $D_{10}$ where the cumulative volume from the fine particle side reaches 10% is 1.9 or more.

[3] The carbonaceous material according to [1] or [2], wherein an average interplanar spacing $d_{002}$ of the (002) plane, calculated using the Bragg equation according to a wide-angle X-ray diffraction method, is 0.36 nm or more.

[4] The carbonaceous material according to any one of [1] to [3], wherein the carbonaceous material is derived from a plant.

[5] A negative electrode for an electrochemical device, comprising the carbonaceous material according to any one of [1] to [4].

[6] An electrochemical device comprising the negative electrode for an electrochemical device according to [5].

[7] A method for producing a carbonaceous material, comprising a step of subjecting a carbon precursor or a carbon precursor-calcined product to primary pulverization, a step of classifying the carbon precursor or the carbon precursor-calcined product after primary pulverization, and a step of subjecting the carbon precursor or the carbon precursor-calcined product after classification, to secondary pulverization, as well as a step of calcining a carbon precursor.

[8] The production method according to [7], wherein the carbon precursor or the carbon precursor-calcined product is pulverized in the primary pulverization step so that an average particle size $D_{50}$ is 2.7 μm or more and 300 μm or less.

[9] The method for producing a carbonaceous material according to [7] or [8], wherein the carbon precursor or the carbon precursor-calcined product after primary pulverization is classified in the classification step so that a content ratio of a particle having a size of 1 μm or less is 6% by volume or less.

[10] The production method according to any one of [7] to [9], wherein the carbon precursor or the carbon precursor-calcined product after classification is pulverized in the secondary pulverization step so that an average particle size $D_{50}$ is 1 μm or more and 50 μm or less and a particle size distribution index $D_{50}/D_{10}$ with the average particle size $D_{50}$ and a particle size $D_{10}$ where a cumulative volume reaches 10% is 1.9 or more.

Effect of the Invention

The present invention can provide a carbonaceous material suitable as an electrode material of an electrochemical device which is increased in capacity with not only suppression of an increase in irreversible capacity, but also securement of a high electrode density, as well as a method for producing the carbonaceous material.

MODE FOR CARRYING OUT THE INVENTION

Hereinafter, embodiments of the present invention are described in detail, but the present invention is not limited thereto.

[Carbonaceous Material]

The carbonaceous material of the present invention has a BET specific surface area of 23 m$^2$/g or less. A BET specific surface area of more than 23 m$^2$/g causes an increase in area for reaction with an electrolytic solution in the case of use in an electrode material, thereby leading to an increase in irreversible capacity and a decrease in discharge capacity. The BET specific surface area is preferably 20 m$^2$/g or less, more preferably 18 m$^2$/g or less, further preferably 16 m$^2$/g or less from the viewpoint of effective suppression of an increase in irreversible capacity. The BET specific surface area is preferably 2 m$^2$/g or more, more preferably 3 m$^2$/g or more, further preferably 4 m$^2$/g or more from the viewpoints of securement of a proper area for reaction with an electrolytic solution in the case of use of the carbonaceous material in an electrode material and an enhancement in charge capacity in the case of use thereof in an electrochemical device. For example, a smaller specific surface area tends to be achieved due to a higher calcining temperature and/or a longer calcining time, and the BET specific surface area can be controlled to a specific surface area which is in the desired range, by adjusting the calcining temperature, the calcining time, and the like of a carbon precursor for providing the carbonaceous material.

In the present invention, the BET specific surface area can be calculated according to a nitrogen adsorption method, and can be calculated according to, for example, a method described in Examples below.

The carbonaceous material of the present invention has an aerated energy of 40 mJ or more and 210 mJ or less as measured with a powder rheometer. The aerated energy (AE: Aerated Energy, hereinafter, also simply referred to as "AE") as measured with a powder rheometer represents a powder state of the carbonaceous material which is filled, and in a case where the AE of the carbonaceous material is equal to or less than the upper limit value and equal to or more than the lower limit value, an electrode obtained from the carbonaceous material can be enhanced in density and increased in capacity per volume. In this regard, a fine particle excessively present tends to lead to an increase in AE, and in a case where the AE is equal to or less than the upper limit value, coatability of a negative electrode is enhanced and a favorable charge-discharge efficiency is achieved.

In the present invention, the AE is preferably 40 mJ or more, more preferably 50 mJ or more, further preferably 55 mJ or more, and preferably less than 210 mJ, more preferably 205 mJ or less, further preferably 200 mJ or less.

One effective solution for obtaining an electrode for an electrochemical device, the electrode not only having a high electrode density, but also being low in irreversible capacity, can be to control the specific surface area in a proper range and also increase the amount of filling of a carbonaceous material in the electrode. However, the electrode density cannot be generally controlled simply by, for example, the tap density or the like which can serve as an index of the amount of filling. It is important to compositely involve various factors, for example, the particle size, particle size distribution and specific surface area of a carbonaceous material, and the shape, cohesion and fluidity of a particle of a carbonaceous material and also control these factors in a well-balanced manner. Thus, it has been difficult to control the electrode density in filling of a carbonaceous material even if the factors are each used for an index.

On the contrary, the present invention has found that the above-mentioned AE compositely reflects various factors of the carbonaceous material and serves as a parameter closely correlated with the electrode density, and has adopted the AE as a new index. Thus, a carbonaceous material can be provided which can be accurately and easily controlled in electrode density in filling of the carbonaceous material and which is suitable for obtaining an electrode for an electrochemical device, the electrode not only having a high electrode density, but also being low in irreversible capacity. In other words, the AE does not simply reflect individually various factors, for example, the particle size distribution of the carbonaceous material, the shape of a particle thereof, a chemical state due to a functional group or the like on a surface of the carbonaceous material, and cohesion and fluidity thereof, but compositely reflects properties based on these factors. Accordingly, for example, control of the electrode density, which is difficult to perform by adjustment of only a particle size distribution, can be accurately and easily performed with the AE as an index.

In the present invention, the AE is measured with a powder rheometer, which is a powder fluidity analysis apparatus. Specifically, it is measured as the value of energy (J) for movement of a blade installed in the apparatus, depending on the blade height, required for movement of the blade in the state where a sample powder filled in the apparatus is under aeration in an amount of aeration of 2 mm/sec from the bottom portion of the apparatus. For example, a powder rheometer FT4 manufactured by Freeman Technology can be used as the measurement apparatus of the AE.

The AE in the present invention can be calculated according to, for example, a method described in Examples below. Specifically, measurement with a powder rheometer FT4 manufactured by Freeman Technology is performed by aeration in an amount of aeration of 2 mm/sec from the bottom portion of the apparatus, progress of the blade into a container filling the powder with rotation of the blade at a constant airfoil tip speed, and measurement of a normal stress F with a load cell at the bottom portion of the apparatus and a rotary torque T with a torque meter at the upper portion of the apparatus. The energy required for movement of the blade into the powder can be here calculated from the normal stress F, the rotary torque T and the blade height. Herein, the blade radius (also referred to as "blade airfoil diameter") is designated as R, the helix angle in movement of the blade tip is designated as $\alpha°$, and the movement energy of the blade depending on the blade height is designated as the aerated energy (AE). In other words, the aerated energy (AE) is determined according to the following calculating formula:

$$AE=T/(R \tan \alpha)+F$$

The powder rheometer FT4 manufactured by Freeman Technology is here set as follows: $\alpha=5°$, R=48 mm, the diameter of the container filling the powder is 50 mm, and the volume of the container is 160 mm$^3$ (Yukiyoshi Hiramura, "Consideration between Evaluation of Powder Rheology and Flowability", J. Soc. Powder Technol., Japan, 2017, Vol. 54, No. 9, pages 604 to 608). For example, the aerated energy 5                                    6

(AE) can be calculated by filling of 120 mL of the powder in the container and leveling thereof, aeration in an amount of aeration of 2 mm/sec from the bottom portion of the apparatus, and progress with rotation at an airfoil tip speed of 100 mm/sec.

The AE of the carbonaceous material of the present invention can be controlled by, for example, adjusting conditions, the order, the number of times, and the like of each of pulverization and classification steps in a method for producing the carbonaceous material. In such a case, for example, pulverization conditions and classification conditions can be controlled with the AE being confirmed, for example, at appropriate stages in such pulverization and classification steps in the course of production of the carbonaceous material. The AE can also be controlled by mixing the carbonaceous material which is relatively small in particle size and the carbonaceous material which is relatively large in particle size at an appropriate ratio.

In the present invention, the average particle size $D_{50}$ where the cumulative volume from the fine particle side in a particle size distribution of the carbonaceous material, measured according to a laser scattering method, reaches 50% is preferably 1 μm or more and 50 μm or less. In a case where the average particle size $D_{50}$ is in the above range, not only an increase in specific surface area can be suppressed to lead to a decrease in irreversible capacity, but also electrode formation is facilitated. The average particle size $D_{50}$ is more preferably 1.5 μm or more, further preferably 2 μm or more, particularly preferably 2.5 μm or more, and more preferably 30 μm or less, further preferably 15 μm or less, particularly preferably 10 μm or less, most preferably 8 μm or less.

In the present invention, the average particle size $D_{50}$ can be measured according to a laser scattering method, and can be measured and calculated with, for example, a method described in Examples below.

In the carbonaceous material of the present invention, the particle size distribution index $D_{50}/D_{10}$ with the average particle size $D_{50}$ and the particle size $D_{10}$ where the cumulative volume from the fine particle side reaches 10% is preferably 1.9 or more. If the particle size distribution index $D_{50}/D_{10}$ is equal to or more than the lower limit value, the AE of the carbonaceous material is easily in the specified range, the density of an electrode obtained from the carbonaceous material is easily higher, and the capacity per volume is easily increased. The particle size distribution index $D_{50}/D_{10}$ is more preferably more than 1.9, further preferably 2.0 or more, still more preferably 2.1 or more, particularly preferably 2.5 or more, and preferably 10.0 or less, more preferably 5.0 or less, further preferably 4.5 or less, particularly preferably 4.0 or less.

The particle size distribution index $D_{50}/D_{10}$ can be calculated from $D_{10}$ and $D_{50}$ measured and calculated according to a laser scattering method.

The average interplanar spacing $d_{002}$ of the (002) plane of the carbonaceous material of the present invention, calculated using the Bragg equation according to a wide-angle X-ray diffraction method, is preferably 0.36 nm or more, more preferably 0.37 nm or more, further preferably 0.38 nm or more, and preferably 0.42 nm or less, more preferably 0.41 nm or less, further preferably 0.40 nm or less. In a case where the average interplanar spacing $d_{002}$ of the (002) plane is in the above range, favorable input and output properties are exhibited. The average interplanar spacing can be controlled by adjusting the calcining temperature of the carbonaceous material or a carbon precursor for providing the carbonaceous material.

[Method for Producing Carbonaceous Material]

The carbonaceous material of the present invention can be produced by, for example, a method including a step of subjecting a carbon precursor or a carbon precursor-calcined product to primary pulverization, a step of classifying the carbon precursor or the carbon precursor-calcined product after primary pulverization, and a step of subjecting the carbon precursor or the carbon precursor-calcined product after classification, to secondary pulverization, as well as a step of calcining a carbon precursor.

Accordingly, the present invention is also directed to a method for producing the carbonaceous material, including the above-mentioned steps.

The AE of the carbonaceous material can be controlled in the desired range by primary pulverization of a carbon precursor or a carbon precursor-calcined product (hereinafter, both are also collectively referred to as "carbon precursor or the like") as a coarse particle, thereafter removal of a fine powder by classification, and then secondary pulverization to a desired particle size. Accordingly, the respective steps of primary pulverization, classification and secondary pulverization are performed in the listed order in the method. In this regard, the carbon precursor is not dissolved by calcining, and thus the average particle size of the carbon precursor is not substantially changed before and after calcining. Thus, the order of performing the pulverization and classification steps, and the calcining step is not particularly limited, and the carbonaceous material before calcining may be subjected to the pulverization and classification steps or the carbonaceous material after calcining (namely, carbon precursor-calcined product) may be subjected to the pulverization and classification steps.

In the present invention, the step of subjecting a carbon precursor or a carbon precursor-calcined product to primary pulverization (hereinafter, also referred to as "primary pulverization step") is a step of pulverizing a carbon precursor or the like as a coarse particle to a fine particle. The average particle size of the carbon precursor or the like to be subjected to primary pulverization may be appropriately determined depending on a carbon material or a carbon precursor serving as a raw material, and is not particularly limited. The average particle size $D_{50}$ of the carbon precursor or the like to be subjected to primary pulverization is usually 100 μm or more and 10000 μm or less, preferably 200 μm or more, more preferably 400 μm or more, and preferably 8000 μm or less, more preferably 5000 μm or less from the viewpoint that control to a desired particle size is easily made and handleability is excellent.

The average particle size $D_{50}$ of the carbon precursor or the like to be subjected to primary pulverization can be measured according to a laser scattering method as in measurement of the average particle size $D_{50}$ of the carbonaceous material of the present invention.

In one aspect of the present invention, the carbon precursor or the like is preferably pulverized in the primary pulverization step so that the average particle size $D_{50}$ is 2.7 μm or more and 300 μm or less. As previously described, the AE of the carbonaceous material is determined by compositely reflecting many factors, for example, the particle size, particle size distribution and shape of the carbonaceous material, and a chemical state due to a functional group or the like on a surface of the carbonaceous material. Therefore, the AE of the carbonaceous material obtained is not directly determined by control of the particle size of the carbon precursor or the like in primary pulverization, but the particle size of the carbon precursor or the like after primary pulverization is in the above-mentioned range to thereby easily obtain a carbonaceous material having an AE in a range of 40 mJ or more and 210 mJ or less through the subsequent classification and secondary pulverization steps. In the present invention, the average particle size $D_{50}$ of the carbon precursor or the like after primary pulverization is preferably 3 μm or more, more preferably 4 μm or more, and preferably 200 μm or less, more preferably 150 μm or less.

In the present invention, the primary pulverization step may be performed at one time, or may be divided and performed in plural times. In a case where such pulverization is herein divided and performed in plural times, a pulverization step to be performed before a first classification step of classifying the carbon precursor or the like after pulverization is defined as the primary pulverization step.

The pulverizer for use in the primary pulverization step is not particularly limited, and, for example, a jet mill, a ball mill, a bead mill, a hammer mill or a rod mill can be used. The pulverizer may be used singly or in combination of two or more kinds thereof. A system for particle pulverization by contact between particles, typified by a jet mill, leads to a longer pulverization time and an easy reduction in volume efficiency. Thus a system for pulverization under coexistence with a pulverization medium, such as a ball mill or a bead mill, is preferable from the viewpoint of pulverization efficiency. A bead mill is suitable also in that impurities from a pulverization medium can be avoided from being incorporated. In particular, a pulverizer having a classification mechanism is more preferable because a pulverized product is sequentially taken out and the carbon precursor or the like is easily inhibited from being excessively pulverized.

In a case where a ball mill or a bead mill is used as the pulverizer, the material of a medium (ball or bead) thereof is not particularly limited, and, for example, an organic polymeric compound such as polyamide, or an inorganic oxide such as alumina, silica, titania or zirconia can be used. The medium is preferably alumina or zirconia from the viewpoint that contaminations from the medium are hardly generated and the pulverization time is easily shortened. The filling fraction of the medium in the pulverizer is not particularly limited, and is preferably 10 to 90%, more preferably 20 to 80% from the viewpoint that the variation in shape during pulverization is easily suppressed. The pulverization time may be appropriately determined depending on, for example, the particle size of the carbon precursor or the like serving as a raw material and the type of the pulverizer used so that pulverization to a desired particle size can be made.

The pulverization may be any of wet pulverization and dry pulverization, and is preferably dry pulverization from the viewpoint that surface oxidation of the carbon precursor or the like is easily suppressed.

The method for producing the carbonaceous material of the present invention includes a step of classifying the carbon precursor or the like after primary pulverization. The step is a step for removal of a fine powder portion from the carbon precursor or the like after primary pulverization and control of the particle size of the carbon precursor or the like. The content ratio of a particle having a size significantly deviating from the average particle size achieved in primary pulverization, in particular, a fine particle having a size significantly deviating from the average particle size can be decreased to result in suppression of excessive pulverization, and suppression of an increase in irreversible capacity caused by an increase in specific surface area.

In one aspect of the present invention, classification in the classification step after the primary pulverization step is preferably made so that the content ratio of a particle having a size of 1 μm or less is 6% by volume or less, more preferably 5% by volume or less, further preferably 3% by volume or less. Such a particle having a size of 1 μm or less can be removed from the carbon precursor or the like after primary pulverization to result in suppression of excessive pulverization, and suppression of an increase in irreversible capacity caused by an increase in specific surface area. The content ratio of such a particle having a size of 1 μm or less after the classification step is more preferably lower, and may be 0% by volume.

Examples of the method for classifying the carbon precursor or the like (controlling the particle size of the carbon precursor or the like) in the classification step include a method for removing a fine particle having a size of 1 μm or less included in the carbon precursor or the like after primary pulverization, and a method involving repeating an operation including performing primary pulverization so that the average particle size is slightly larger, taking out a large particle included in the carbon precursor or the like after primary pulverization so that a desired average particle size is achieved, and again pulverizing the large particle so that a desired average particle size is achieved. The latter method can produce the carbonaceous material of the present invention, not including any fine particle in a predetermined amount or more, at better productivity.

The classification method is not particularly limited, and examples thereof can include classification with a sieve, wet classification, and dry classification. Examples of a wet classifier can include respective classifiers utilizing the principles of gravity classification, inertial classification, hydraulic classification, centrifugal classification, and the like. Examples of a dry classifier can include respective classifiers utilizing the principles of sedimentation classification, mechanical classification, centrifugal classification, and the like. A dry classification apparatus is preferably used from the viewpoint of economic performance. One apparatus can also be used to perform the primary pulverization and/or a secondary pulverization step described below and the classification step.

The method for producing the carbonaceous material of the present invention includes a step of subjecting the carbon precursor or the like after classification to secondary pulverization (hereinafter, also referred to as "secondary pulverization step"). The AE of a carbonaceous material obtained by subjecting the carbon precursor or the like, from which a fine powder is removed by classification of the carbon precursor or the like after primary pulverization, to secondary pulverization tends to be higher, and an electrode produced using such a material can be enhanced in density.

In one aspect of the present invention, it is preferable in the secondary pulverization step to pulverize the carbon precursor or the like after classification so that the average particle size $D_{50}$ is 1 μm or more and 50 μm or less and the particle size distribution index $D_{50}/D_{10}$ with the average particle size $D_{50}$ and the particle size $D_{10}$ where the cumulative volume from the fine particle side reaches 10% is 1.9 or more. The AE of the carbonaceous material is determined based on many factors, for example, the particle size, particle size distribution and shape of the carbonaceous material, and a chemical state due to a functional group or the like on a surface of the carbonaceous material. Therefore, the AE of the carbonaceous material obtained is not directly determined by control of the particle size of the carbon precursor or the like in secondary pulverization, but the particle size of the carbon precursor or the like after secondary pulverization is adjusted in the above-mentioned range to thereby result in a tendency to increase the AE of the carbonaceous material and easily control the AE of the carbonaceous material obtained, in a range of 40 mJ or more and 210 mJ or less.

In the present invention, the secondary pulverization step may be performed at one time, or may be divided and performed in plural times. In a case where such pulverization is herein divided and performed in plural times, a pulverization step to be performed after first classification is defined as the secondary pulverization step, and in a case where additional classification is subsequently performed, a pulverization step to be performed prior to the classification is defined as the secondary pulverization step. Examples of all the pulverizer, the pulverization time, the pulverization conditions, and the like which can be adopted in the secondary pulverization step are the same as those in the primary pulverization step, and these may be appropriately selected depending on, for example, the desired particle size, particle size distribution, specific surface area, and AE.

While the method for producing the carbonaceous material of the present invention may include additional pulverization and/or classification step(s), in addition to the respective steps of primary pulverization, classification and secondary pulverization, as long as the desired AE and specific surface area are obtained, the final step among the pulverization steps and the classification step included in the steps for obtaining the carbonaceous material is preferably any of the pulverization steps. A carbonaceous material finally obtained by performing substantially no classification after the secondary pulverization or subsequent pulverization is in the state of including a particle having a relatively small size, thereby enabling a particle size distribution to be properly broad. Thus, the AE of the carbonaceous material is easily in a range of 40 mJ or more and 210 mJ or less, the filling amount of the carbonaceous material can be increased, and the electrode density can be enhanced.

The carbonaceous material of the present invention can be obtained by calcining the carbon precursor subjected to the respective steps of primary pulverization, classification and secondary pulverization. In a case where the carbon precursor before primary pulverization is calcined, the carbonaceous material of the present invention can be obtained by subjecting the carbon precursor calcined (namely, carbon precursor-calcined product), to the respective steps of primary pulverization, classification and secondary pulverization.

The calcining (hereinafter, also referred to as "main calcining") is not particularly limited not only in a case where the carbon precursor before primary pulverization is calcined, but also in a case where the carbon precursor after secondary pulverization is calcined, and can be performed according to a usual calcining procedure. The main calcining can be performed to thereby provide a carbonaceous material for an electrochemical device such as a non-aqueous electrolyte secondary battery. The main calcining step is a step of heating the carbon precursor to remove a volatile component and form a carbon backbone.

The calcining temperature in the main calcining is usually, 800 to 1500° C., preferably 850 to 1350° C., more preferably 900 to 1300° C. The main calcining is preferably performed under an inert gas atmosphere. Examples of the inert gas include nitrogen and argon, and the main calcining can also be performed in an inert gas containing a halogen gas. The main calcining may be performed under reduced pressure or may be, for example, performed at 10 kPa or less. The calcining time in the main calcining is not particularly limited, and is, for example, 0.05 to 10 hours, preferably 0.05 to 8 hours, more preferably 0.05 to 6 hours.

In the present invention, in a case where the carbon precursor is derived from a plant, the carbon precursor may also be mixed with a volatile organic substance and then calcined. A mixture of the carbon precursor and a volatile organic substance can be calcined to thereby reduce the specific surface area of the carbonaceous material obtained. The mechanism therefor, although the detail is not clarified, can be considered as follows. However, the present invention is not limited by the following description. It is considered that a plant-derived carbon precursor and a volatile organic substance are mixed and calcined to thereby form a carbonaceous film obtained by a heat treatment of the volatile organic substance, on a surface of the plant-derived carbon precursor. This carbonaceous film results in a reduction in specific surface area of a carbonaceous material generated from the plant-derived carbon precursor and suppression of a reaction for forming a film called SEI (Solid Electrolyte Interphase), obtained by a reaction of this carbonaceous material and lithium, and thus a reduction in irreversible capacity can be expected. In addition, the carbonaceous film generated can also be doped and undoped with lithium, and thus the effect of an increase in capacity can also be expected.

Examples of the volatile organic substance include a thermoplastic resin and a low-molecular organic compound. Specific examples of the thermoplastic resin may include polystyrene, polyethylene, polypropylene, poly(meth) acrylic acid, and poly(meth)acrylic acid ester. Herein, the "(meth)acrylic" is a collective term of acrylic and methacrylic. Examples of the low-molecular organic compound may include toluene, xylene, mesitylene, styrene, naphthalene, phenanthrene, anthracene, and pyrene. One is preferable which, if volatilized and pyrolyzed at the calcining temperature, does not oxidize and activate a surface of the carbon precursor, and thus the thermoplastic resin is preferably polystyrene, polyethylene, or polypropylene. The low-molecular organic compound is preferably low in volatility at ordinary temperature further from the viewpoint of safety, and is preferably, for example, naphthalene, phenanthrene, anthracene, or pyrene.

In one aspect of the present invention, examples of the thermoplastic resin may include an olefin-based resin, a styrene-based resin, and a (meth)acrylic acid-based resin. Examples of the olefin-based resin may include polyethylene, polypropylene, a random copolymer of ethylene and propylene, and a block copolymer of ethylene and propylene. Examples of the styrene-based resin may include polystyrene, poly(α-methylstyrene), and a copolymer of styrene and (meth)acrylic acid alkyl ester (the alkyl group has 1 to 12 carbon atoms, preferably 1 to 6 carbon atoms). Examples of the (meth)acrylic acid-based resin may include polyacrylic acid, polymethacrylic acid, and a (meth)acrylic acid alkyl ester polymer (the alkyl group has 1 to 12 carbon atoms, preferably 1 to 6 carbon atoms).

In one aspect of the present invention, the low-molecular organic compound here used can be, for example, a hydrocarbon compound having 1 to 20 carbon atoms. The number of carbon atoms in the hydrocarbon compound is preferably 2 to 18, more preferably 3 to 16. The hydrocarbon compound may be a saturated hydrocarbon compound or an unsaturated hydrocarbon compound, and may be a linear hydrocarbon compound or a cyclic hydrocarbon compound. In the case of an unsaturated hydrocarbon compound, the unsaturated bond may be a double bond or a triple bond and the number of such unsaturated bonds included in one molecule is also not particularly limited. For example, the linear hydrocarbon compound is an aliphatic hydrocarbon compound, and examples thereof may include straight or branched alkane, alkene or alkyne. Examples of the cyclic hydrocarbon compound may include an alicyclic hydrocarbon compound (for example, cycloalkane, cycloalkene, and cycloalkyne) or an aromatic hydrocarbon compound. Specific examples of the aliphatic hydrocarbon compound may include methane, ethane, propane, butane, pentane, hexane, octane, nonane, decane, ethylene, propylene, butene, pentene, hexane, and acetylene. Examples of the alicyclic hydrocarbon compound may include cyclopentane, cyclohexane, cycloheptane, cyclooctane, cyclononane, cyclopropane, cyclopentene, cyclohexene, cycloheptene, cyclooctene, decalin, norbornene, methylcyclohexane, and norbornadiene. Furthermore, examples of the aromatic hydrocarbon compound may include monocyclic aromatic compounds such as benzene, toluene, xylene, mesitylene, cumene, butylbenzene, styrene, α-methylstyrene, o-methylstyrene, m-methylstyrene, p-methylstyrene, vinylxylene, p-tert-butylstyrene and ethylstyrene, and 3-membered to 6-membered condensed polycyclic aromatic compounds such as naphthalene, phenanthrene, anthracene and pyrene, and a condensed polycyclic aromatic compound is preferable, and naphthalene, phenanthrene, anthracene or pyrene is more preferable. The hydrocarbon compound may have any substituent. Such the substituent is not particularly limited, and examples thereof may include an alkyl group having 1 to 4 carbon atoms (preferably an alkyl group having 1 to 2 carbon atoms), an alkenyl group having 2 to 4 carbon atoms (preferably an alkenyl group having 2 carbon atoms), and a cycloalkyl group having 3 to 8 carbon atoms (preferably a cycloalkyl group having 3 to 6 carbon atoms).

The volatile organic substance is preferably in a solid state at ordinary temperature, and is more preferably, for example, a thermoplastic resin which is a solid at ordinary temperature, such as polystyrene, polyethylene or polypropylene, or a low-molecular organic compound which is a solid at ordinary temperature, such as naphthalene, phenanthrene, anthracene or pyrene, from the viewpoints of ease of mixing and avoidance of uneven distribution. One is preferable which, if volatilized and pyrolyzed at the calcining temperature, does not oxidize and activate a surface of the plant-derived carbon precursor, and thus the thermoplastic resin is preferably an olefin-based resin and a styrene-based resin, more preferably any of polystyrene, polyethylene and polypropylene. The low-molecular organic compound is preferably low in volatility at ordinary temperature, in terms of safety, and thus is preferably a hydrocarbon compound having 1 to 20 carbon atoms, more preferably a condensed polycyclic aromatic compound, further preferably naphthalene, phenanthrene, anthracene or pyrene. Furthermore, a thermoplastic resin is preferable, an olefin-based resin and a styrene-based resin are more preferable, polystyrene, polyethylene and polypropylene are further preferable, and polystyrene and polyethylene are particularly preferable, from the viewpoint of ease of mixing with the carbon precursor.

The volatile organic substance is an organic substance preferably having a residual carbon ratio of less than 5% by mass, more preferably less than 3% by mass from the viewpoint of stable running of calcining equipment. The residual carbon ratio in the present invention preferably corresponds to a residual carbon ratio in the case of ashing at 800° C. The volatile organic substance is preferably one which generates a volatile substance (for example, a hydrocarbon-based gas or a tar component) capable of reducing the specific surface area of a carbon precursor produced from plant-derived char. The residual carbon ratio is preferably less than 5% by mass from the viewpoint that properties of a carbonaceous material produced after calcining are maintained. In a case where the residual carbon ratio is less than 5%, a carbonaceous material locally different in properties is hardly generated.

The residual carbon ratio can be measured by quantitatively determining the amount of carbon in an ignition residue after ignition of a sample in an inert gas. The ignition here involves loading about 1 g (this accurate mass is defined as $W_1$ (g)) of the volatile organic substance into a crucible, heating the crucible in an electric furnace with flow of nitrogen at 20 L/min, from ordinary temperature to 800° C. at a rate of temperature rise of 10° C./min, and then performing ignition at 800° C. for 1 hour. The residue here is defined as an ignition residue, and the mass thereof is defined as $W_2$ (g).

Next, the ignition residue is subjected to element analysis according to a method prescribed in JIS M8819, and the mass proportion $P_1$ (%) of carbon is measured. The residual carbon ratio $P_2$ (% by mass) can be calculated by the following formula (I).

[formula 1]

$$P_2 = P_1 \times W_2 / W_1 \tag{I}$$

In a case where the carbon precursor and the volatile organic substance are mixed, the mass ratio between the carbon precursor and the volatile organic substance in the mixture is not particularly limited, and the mass ratio between the carbon precursor and the volatile organic substance is preferably 99:1 to 40:60. The mass ratio between the carbon precursor and the volatile organic substance in the mixture is more preferably 97:3 to 40:60, further preferably 95:5 to 60:40, particularly preferably 93:7 to 80:20. For example, in a case where the volatile organic substance is mixed at a ratio of 1 part by mass or more, the specific surface area can be sufficiently reduced. In a case where the volatile organic substance is mixed at a ratio of 60 parts by mass, the effect of reducing the specific surface area is not saturated and the volatile organic substance is hardly consumed excessively, and thus an industrial advantage is obtained.

In a case where the carbon precursor is mixed with the volatile organic substance, the mixing may be made at any state as long as such any stage is prior to calcining of the carbon precursor, and the mixing may be made before the primary pulverization step or may be made after primary pulverization, classification and secondary pulverization.

The carbon precursor serving as a raw material of the carbonaceous material of the present invention is a carbonaceous material precursor for supplying a carbon component in production of the carbonaceous material, and can be widely selected from a plant-derived carbon precursor, a mineral-derived carbon precursor, a natural material-derived carbon precursor and a synthetic material-derived carbon precursor. The carbonaceous material of the present invention is preferably based on a plant-derived carbon precursor from the viewpoint of reduction of harmful impurities, from the viewpoint of environmental protection and from a commercial viewpoint, and, in other words, the carbon precursor serving as a raw material of the carbonaceous material of the present invention is preferably plant-derived.

Examples of the mineral-derived carbon precursor include petroleum and coal pitches, and coke. Examples of the natural material-derived carbon precursor include respective carbides of natural fibers such as cotton and hemp, regenerated fibers such as rayon and viscose rayon, and semisynthetic fibers such as acetate and triacetate. Examples of the synthetic material-derived carbon precursor include respective carbides of polyamide-based resins such as nylon, polyvinyl alcohol-based resins such as vinylon, polyacrylonitrile-based resins such as acryl, polyolefin-based resins such as polyethylene and polypropylene, polyurethane, phenol-based resins, and vinyl chloride-based resins.

The plant-derived carbon precursor can be produced by subjecting a plant-derived carbon material (hereinafter, also referred to as "plant-derived char") used as a raw material, to, for example, activation and/or demineralizing treatment(s).

Accordingly, the method for producing the carbonaceous material of the present invention may include, in addition to the respective steps of pulverization, classification and calcining, for example, (i) a step of subjecting the plant-derived carbon material or the like serving as a raw material to an activation treatment, and/or (ii) a step of subjecting the plant-derived carbon material or the like serving as a raw material to a demineralizing treatment.

The char herein means generally a powdery solid rich in carbon content, which is obtained in heating of coal and which is not softened by melting, and here also means a powdery solid rich in carbon content, which is obtained in heating of an organic substance and which is not softened by melting.

The plant (hereinafter, also referred to as "plant raw material") serving as a raw material of the plant-derived char is not particularly limited. Examples of the plant raw material include coconut shell, coffee bean, tea leaf, sugar cane, fruit (for example, mandarin orange and banana), straw, chaff, hardwood, softwood, and bamboo. Such examples encompass waste (for example, used tea leaf) after application to the original use, or a portion of the plant raw material (for example, peels of banana and mandarin orange). These plant raw materials may be used singly or in combination of two or more kinds thereof. Among these plant raw materials, coconut shell is preferable because of being easily available in a large amount.

The coconut shell is not particularly limited, and examples thereof include coconut shells such as palm (oil palm), coconut palm, salak, and double coconut. The coconut shell may be used singly or in combination of two or more kinds thereof. Coconut shells of coconut palm and palm, as biomass waste generated in a large amount after use of such palm in, for example, a food product, a raw material of a detergent, or a raw material of biodiesel oil, are particularly preferable from the viewpoint of availability.

The method for producing the plant-derived char from the plant raw material is not particularly limited, and the plant-derived char can be produced by, for example, a heat treatment (hereinafter, also referred to as "temporary calcining") of the plant raw material at a temperature of 300° C. or more under an inert gas atmosphere.

The heat treatment temperature in the temporary calcining is not particularly limited as long as it is 300° C. or more. If the heat treatment temperature in the temporary calcining is too high, the char may be highly crystallized to make subsequent pulverization difficult. Thus, the heat treatment temperature in the temporary calcining is usually 300° C. to 1000° C., preferably 400° C. to 900° C., more preferably 500° C. to 800° C.

The heat treatment time in the temporary calcining is not particularly limited. If the heat treatment time in the temporary calcining is too long, the char may be highly crystallized to make subsequent pulverization difficult. Thus, the heat treatment time in the temporary calcining is usually 1 to 24 hours, preferably 1.5 to 20 hours, more preferably 2 to 15 hours.

It is also possible to obtain the form of plant-derived char (for example, coconut shell char).

A carbonaceous material produced from the plant-derived char can be doped with a large amount of an active material, and is essentially suitable as a carbonaceous material for an electrochemical device such as a non-aqueous electrolyte secondary battery. However, in general, a plant-derived char often includes a large amount of metal element(s) (in particular, potassium, iron, and/or the like) contained in a plant raw material, and an electrode including such a carbonaceous material high in content of metal element(s), when used in an electrochemical device, may have any undesired effect on electrochemical characteristics and safety. Accordingly, the content of a potassium element, an iron element, and/or the like included in such a carbonaceous material is preferably reduced when possible.

Such plant-derived char also often includes an alkali metal (for example, sodium), an alkali earth metal (for example, magnesium or calcium), a transition metal (for example, copper) and other elements (hereinafter, also collectively referred to as "ash"), in addition to potassium and iron elements. In a case where an electrode including a carbonaceous material containing these metal elements is used in, for example, a negative electrode of a non-aqueous electrolyte secondary battery such as a lithium-ion secondary battery, impurities are dissolved out into an electrolytic solution during undoping from the negative electrode and have any undesired effect on battery performance, and can cause loss of reliability of the non-aqueous electrolyte secondary battery. Thus the content of these metals is also preferably reduced. In addition, the ash in such a carbonaceous material is decreased to thereby allow pore shrinkage in such a carbonaceous material to be suppressed and allow the battery to be enhanced in charge-discharge capacity.

Accordingly, the content of ash (alkali metal element, alkali earth metal element, transition metal element, and other elements) in the plant raw material or the plant-derived char is preferably reduced in advance before calcining of the carbon precursor to obtain the carbonaceous material. Such a reduction in content of ash in the plant raw material or the plant-derived char is hereinafter also referred to as "demineralizing". The demineralizing method is not particularly limited, and, for example, a method (liquid phase demineralizing) involving extracting and demineralizing the metal content with an acidic solution including, for example, a mineral acid such as hydrochloric acid or sulfuric acid and/or an organic acid such as acetic acid or formic acid, and a method (gas phase demineralizing) involving demineralizing by exposure to a high-temperature gas phase containing a halogen compound such as hydrogen chloride.

The liquid phase demineralizing may be performed with any mode of the plant raw material or the plant-derived char. The liquid phase demineralizing can be performed by, for example, immersing the plant raw material or the plant-derived char in an acidic solution. The acidic solution is a mixture of an acid and an aqueous solution. The acid is not particularly limited, and examples thereof include respective solutions in water, of mineral acids such as hydrochloric acid and sulfuric acid, and organic acids such as acetic acid, butyric acid and citric acid. The acid here used is preferably an organic acid from the viewpoint that an unnecessary ion is avoided from remaining in an object subjected to demineralizing, and is preferably acetic acid and/or citric acid from the viewpoints of the efficiency of the demineralizing, economic performance such as acid price, and relative easiness of a waste liquid treatment after use. Examples of the aqueous solution include water, and a mixture of water and a water-soluble organic solvent. Examples of the water-soluble organic solvent include alcohols such as methanol, ethanol, propylene glycol and ethylene glycol.

The acid concentration in the acidic solution is not particularly limited, and is preferably in a range from 0.001 to 1 M, more preferably in a range from 0.002 to 0.9 M, further preferably in a range from 0.005 to 0.5 M because the acid concentration has an effect on the rate of demineralizing. The amount of the acidic solution used is also not particularly limited, and is preferably an amount to such an extent that the plant raw material or the plant-derived char to be immersed is immersed in the acidic solution, and, for example, the mass of the acidic solution relative to the mass of the plant raw material or the plant-derived char to be immersed is preferably 100 to 1000% by mass, more preferably 200 to 900% by mass, further preferably 250 to 800% by mass.

The temperature of the liquid phase demineralizing may be determined depending on the plant raw material or the plant-derived char as an object to be subjected to demineralizing, and may be, for example, 10 to 120° C. and is preferably 20 to 100° C., more preferably 25 to 95° C. In a case where the demineralizing temperature is in the above range, demineralizing can be efficiently performed with suppression of a reduction in carbon content due to hydrolysis of an organic substance constituting plant.

The time of the liquid phase demineralizing is not particularly limited, and may be, for example, 0.1 to 100 hours, and is preferably 0.2 to 50 hours, more preferably 0.5 to 20 hours. The liquid phase demineralizing may be performed by continuously immersing the plant raw material or the plant-derived char in the acidic solution, or may be divided and performed in plural times with the acidic solution for use in the demineralizing being renewed. In a case where the liquid phase demineralizing is divided and performed in plural times, the total demineralizing time is defined as the time of the liquid phase demineralizing.

The apparatus for use in the liquid phase demineralizing is not particularly limited as long as it is an apparatus in which the plant raw material or the plant-derived char can be immersed in the acidic solution. For example, a stirring tank made of glass lining may be used.

The gas phase demineralizing may be performed with any mode of the plant raw material or the plant-derived char. The gas phase demineralizing can be performed by, for example, a heat treatment of the plant raw material or the plant-derived char in a gas phase containing a halogen compound. The halogen compound is not particularly limited, and examples thereof include fluorine, chlorine, bromine, iodine, hydrogen fluoride, hydrogen chloride, hydrogen bromide, iodine bromide, chlorine fluoride (ClF), iodine chloride (ICl), iodine bromide (IBr), and bromine chloride (BrCl). A compound which generates such a halogen compound by pyrolysis, or a mixture thereof can also be used. The halogen compound is preferably hydrogen chloride from the viewpoints of supply stability and stability of the halogen compound used.

The gas phase demineralizing may be performed in a gas phase where the halogen compound and an inert gas are mixed. The inert gas is not particularly limited as long as it is a gas not reactive with any object to be subjected to demineralizing (plant raw material or plant-derived char) and the plant raw material or the plant-derived char after the demineralizing, at the demineralizing temperature. Examples include nitrogen, helium, argon or krypton, or a mixed gas thereof. The inert gas is preferably nitrogen from the viewpoints of supply stability and economic performance.

In a case where the gas phase demineralizing is performed in a gas phase where the halogen compound and the inert gas are mixed, the mixing ratio between the halogen compound and the inert gas is not particularly limited as long as sufficient demineralizing can be achieved. For example, the amount of the halogen compound relative to the inert gas is preferably 0.01 to 10.0% by volume, more preferably 0.05 to 8.0% by volume, further preferably 0.1 to 5.0% by volume.

The temperature of the gas phase demineralizing may be determined depending on the plant raw material or the plant-derived char as an object to be subjected to demineralizing, and may be, for example, 500 to 1100° C. and is preferably 600 to 1050° C., more preferably 650 to 1000° C., further preferably 850 to 1000° C. If the demineralizing temperature is too low, the efficiency of the demineralizing is lowered and the demineralizing cannot be sufficiently made in some cases. If the demineralizing temperature is too high, activation due to the halogen compound may occur.

The time of the gas phase demineralizing is not particularly limited, and is, for example, 5 to 300 minutes, preferably 10 to 200 minutes, more preferably 15 to 150 minutes.

The amount of supply (amount of flow) of the gas phase in the gas phase demineralizing is not particularly limited, and is, for example, preferably 1 ml/min or more, more preferably 5 ml/min or more, further preferably 10 ml/min or more per gram of the plant raw material or the plant-derived char.

The apparatus for use in the gas phase demineralizing is not particularly limited as long as it is an apparatus in which the plant raw material or the plant-derived char and the gas phase including the halogen compound can be heated while mixing. For example, a fluidized bed furnace is used to perform an intralayer distribution process in a continuous mode or a batch mode using a fluidized bed or the like.

In a case where the gas phase demineralizing is performed, a heat treatment in the presence of no halogen compound may also be further performed after the heat treatment in the gas phase including the halogen compound. The heat treatment in the gas phase including the halogen compound usually causes halogen to be included in the plant raw material or the plant-derived char. The halogen included in the plant raw material or the plant-derived char can be removed by the heat treatment in the presence of no halogen compound. For example, the halogen can be removed by performing a heat treatment with blocking of supply of the halogen compound after the heat treatment in the gas phase including the halogen compound. Specifically, the heat treatment in the presence of no halogen compound may be performed by a heat treatment at 500° C. to 1100° C., preferably 600 to 1050° C., more preferably 650 to 1000° C., further preferably 850 to 1000° C. in an inert gas atmosphere including no halogen compound. The temperature of the heat treatment in the presence of no halogen compound is preferably the same as or higher than the temperature of the heat treatment in the gas phase including the halogen compound. The time of the heat treatment in the presence of no halogen compound is also not particularly limited, and is preferably 5 minutes to 300 minutes, more preferably 10 minutes to 200 minutes, further preferably 10 minutes to 100 minutes.

The liquid phase demineralizing and the gas phase demineralizing in the present embodiment are each a treatment for removal of ash such as potassium and iron included in the plant raw material or the plant-derived char. The content of a potassium element in the carbon precursor obtained after the liquid phase demineralizing treatment or gas phase demineralizing treatment is preferably 1000 ppm (0.1% by weight) or less, more preferably 500 ppm or less, further preferably 300 ppm or less. The content of an iron element in the carbon precursor obtained after the liquid phase demineralizing treatment or gas phase demineralizing treatment is preferably 200 ppm or less, more preferably 150 ppm or less, further preferably 100 ppm or less. The contents of a potassium element and an iron element in the carbon precursor are each preferably equal to or less than the upper limit because, in a case where the carbonaceous material obtained is used in an electrode for an electrochemical device such as a non-aqueous electrolyte secondary battery, dissolution of impurities into an electrolytic solution during undoping can be reduced and such an electrochemical device is enhanced in performance and is enhanced in reliability.

In a case where the plant raw material is used in the liquid phase demineralizing or gas phase demineralizing, the plant-derived char after the liquid phase demineralizing or gas phase demineralizing treatment can be produced by temporary calcining with a heat treatment of the plant raw material after the liquid phase demineralizing or gas phase demineralizing treatment at a temperature of 300° C. or more under an inert gas atmosphere. The heat treatment temperature and the heat treatment time in the temporary calcining here are also as described above.

The average particle size of the plant raw material or the plant-derived char as an object to be subjected to demineralizing is not particularly limited. In a case where the liquid phase demineralizing is performed, the lower limit of the average particle size is preferably 500 μm or more, more preferably 1 mm or more, further preferably 2 mm or more from the viewpoint that the carbon precursor after the demineralizing treatment is easily separated from an extracted liquid. The upper limit of the average particle size is preferably 40 mm or less, more preferably 35 mm or less, further preferably 30 mm or less. In a case where the gas phase demineralizing is performed, a too small average particle size makes it difficult to separate a gas phase containing potassium and the like removed by the demineralizing and the carbon precursor after the demineralizing treatment, and thus the lower limit of the average particle size is preferably 100 μm or more, more preferably 200 μm or more, further preferably 400 μm or more. The upper limit of the average particle size is preferably 10000 μm or less, more preferably 8000 μm or less, further preferably 5000 μm or less.

The carbonaceous material of the present invention can be obtained by subjecting the carbon precursor obtained through such treatments, to the primary pulverization, the classification and the secondary pulverization, as well as the calcining, as described above.

In the present invention, the carbonaceous material of the present invention, having a desired AE, can also be prepared by mixing two or more kinds of carbon precursors or carbonaceous materials which are different in physical properties (for example, average particle size and particle size distribution) from each other. In a case where the carbonaceous material of the present invention, having a desired AE, is prepared by mixing two or more kinds of such carbon precursors or carbonaceous materials, the types and the compounding proportions of such carbon precursors or carbonaceous materials mixed may be appropriately determined depending on the desired AE. Also in such a case, at least one of such carbon precursors or carbonaceous materials mixed is preferably the carbon precursor or the carbonaceous material obtained through the respective steps of primary pulverization, classification and secondary pulverization. In a case where at least one of such carbon precursors or carbonaceous materials is one obtained through the respective steps, the AE of the carbonaceous material obtained is easily controlled in a desired range.

In a case where the carbonaceous material of the present invention is prepared by mixing two or more kinds of such carbon precursors or carbonaceous materials, the amount of compounding of the carbon precursor or the carbonaceous material produced through the respective steps of primary pulverization, classification and secondary pulverization may be appropriately determined depending on physical properties and the like of such carbon precursors or carbonaceous materials used, and is, for example, 20% by mass or more based on the total mass of a final mixture of such carbon precursors or carbonaceous materials. The upper limit of the amount of compounding of the carbon precursor or the carbonaceous material produced through the respective steps of primary pulverization, classification and secondary pulverization in the mixture of such carbon precursors or the carbonaceous materials is not particularly limited, and all the carbon precursor or the carbonaceous material produced may be the carbon precursor or the carbonaceous material produced according to the method.

[Electrode for Electrochemical Device]

The carbonaceous material of the present invention is suitable as a material of an electrode for an electrochemical device, in particular, a negative electrode for an electrochemical device. In a case where the carbonaceous material of the present invention is used, an electrode obtained can be increased in density, an electrode obtained can be increased in density and can be decreased in irreversible capacity, and thus an electrochemical device small in size and high in capacity can be obtained. Examples of an electrochemical device in which the carbonaceous material of the present invention is suitably used include secondary batteries such as a lithium-ion secondary battery, a nickel-hydrogen secondary battery and a nickel-cadmium secondary battery, and capacitors such as an electric double layer capacitor. In particular, the electrochemical device can be particularly a non-aqueous electrolyte secondary battery (for example, lithium-ion secondary battery, sodium ion battery, lithium sulfur battery, lithium air battery, all-solid-state battery, or organic radical battery), and may be more particularly a lithium-ion secondary battery.

Hereinafter, the negative electrode for an electrochemical device of the present invention is described with, as an example, a negative electrode for a non-aqueous electrolyte secondary battery. The negative electrode of the present invention can be produced by coating a current collector plate with an electrode mixture to thereby form an electrode active material layer on the current collector plate. The electrode mixture can be obtained by adding a binding agent (binder) and optionally a conductive aid, and an appropriate solvent in respective proper amounts to the carbonaceous material of the present invention, and kneading them. The electrode active material layer can be formed by, for example, coating a current collector plate with an electrode mixture and drying them, and then performing pressure forming. The current collector plate here used can be, for example, a metal plate.

The binding agent is not particularly limited as long as it is not reactive with an electrolytic solution, and examples thereof include PVDF (polyvinylidene fluoride), polytetrafluoroethylene, and a mixture of SBR (styrene-butadiene rubber) and CMC (carboxymethylcellulose). Among them, PVDF is preferable because PVDF attached to an active material surface less inhibits a lithium ion from moving and favorable input-output properties are easily achieved. The binding agent may be used singly or in combination of two or more kinds thereof. The amount of the binding agent added may be appropriately selected depending on the type of the binding agent used, and is, for example, preferably 1 to 20% by mass, more preferably 1 to 15% by mass. For example, in the case of a PVDF-based binding agent, the amount is preferably 3 to 13% by mass, more preferably 3 to 10% by mass. The amount of the binding agent added is here calculated under the assumption of Amount of active material (carbonaceous material)+Amount of binder+ Amount of conductive aid=100% by mass. In a case where the amount of the binding agent added is in the above range, an electrode obtained can be inhibited from being increased in resistance to result in a reduction in internal resistance of a battery, and an interparticle bond in the carbonaceous material in the electrode and a bond between the carbonaceous material and a current collection material are improved.

The solvent may be appropriately selected depending on the type of the binding agent used. The solvent may be used singly or in combination of two or more kinds thereof. For example, in a case where PVDF is used as the binding agent, a polar solvent such as N-methylpyrrolidone (NMP) is preferably used from the viewpoint that PVDF is dissolved to easily obtain a slurry. In a case where SBR or the like is used as the binding agent, the binding agent may be used in the form of an aqueous emulsion. In a case where CMC is used as the binding agent, the binding agent may be used with being dissolved in a solvent such as water.

For example, two or more kinds of such binding agents, for example, a mixture of SBR and CMC, are often combined and used with water as a solvent. In this aspect, in the case of use of two or more kinds of such binding agents, the total amount of such binding agents is preferably 0.5 to 5% by mass, more preferably 1 to 4% by mass. The amount of such binding agents added is here calculated under the assumption of Amount of active material (carbonaceous material)+Amount of binder+Amount of conductive aid=100% by mass.

A conductive aid may be, if necessary, added in preparation of the electrode mixture in order to impart higher conductivity. The conductive aid here used can be, for example, conductive carbon black, a vapor-grown carbon fiber (VGCF), or a nanotube. The amount of the conductive aid added, while also differs depending on the type of the conductive aid used, is preferably 0.5 to 10% by mass, more preferably 0.5 to 7% by mass, further preferably 0.5 to 5% by mass. The amount of the conductive aid added is here calculated under the assumption of Amount of active material (carbonaceous material)+Amount of binder+Amount of conductive aid=100% by mass. In a case where the amount of the conductive aid added is in the above range, conductivity is easily enhanced and dispersion of the conductive aid in the electrode mixture is also improved.

The electrode active material layer is usually formed on each of both surfaces of the current collector plate, and may be, if necessary, formed on one surface of the current collector plate. The thickness per one surface of the electrode active material layer is preferably 10 to 80 μm, more preferably 20 to 75 μm, further preferably 20 to 60 μm. The thickness of the electrode active material layer is preferably equal to or more than the lower limit from the viewpoint that fewer proportions of the current collector plate, a separator, and the like in a secondary battery are needed and thus the battery is easily increased in capacity. The thickness of the electrode active material layer is preferably equal to or less than the upper limit from the viewpoint that a larger area of the electrode opposite to a counter electrode is more advantageous for enhancements in input-output properties and thus input-output properties are easily increased.

In order to reduce the irreversible capacity of the obtained electrode active material layer, pre-doping with lithium can also be performed according to a known method.

[Electrochemical Device]

The electrochemical device of the present invention includes the negative electrode for an electrochemical device of the present invention, has a high electrode density, is low in irreversible capacity, and has a high capacity.

For example, in a case where the electrochemical device of the present invention is a non-aqueous electrolyte secondary battery, other materials constituting the battery, such as a positive electrode material, a separator and an electrolytic solution, are not particularly limited, and various materials conventionally used in or proposed for a non-aqueous electrolyte secondary battery can be used.

For example, the positive electrode material is preferably a layered oxide-based (represented by $LiMO_2$, wherein M represents a metal: for example, $LiCoO_2$, $LiNiO_2$, $LiMnO_2$, or $LiNi_xCo_yMo_zO_2$ (wherein x, y and z each represent a compositional ratio)), olivine-based (represented by $LiMPO_4$, wherein M represents a metal: for example, $LiFePO_4$), or spinel-based (represented by $LiM_2O_4$, wherein M represents a metal: for example, $LiMn_2O_4$) composite metal chalcogen compound. The positive electrode material here used may be one of such chalcogen compounds or, if necessary, a mixture of two or more kinds of such chalcogen compounds. Such a positive electrode material can be molded together with an appropriate binding agent and a carbonaceous material for imparting conductivity to an electrode, to form a layer on a conductive current collection material, thereby producing a positive electrode.

A non-aqueous solvent-type electrolytic solution used in combination with the positive electrode and the negative electrode can be generally obtained by dissolving an electrolyte in a non-aqueous solvent. Examples of the non-aqueous solvent include an organic solvent such as propylene carbonate, ethylene carbonate, dimethyl carbonate, diethyl carbonate, dimethoxyethane, diethoxyethane, γ-butyllactone, tetrahydrofuran, 2-methyltetrahydrofuran, sulfolane, or 1,3-dioxolane. The organic solvent here used may be one of such organic solvents, or may be a combination of two or more kinds of such organic solvents. Examples of the electrolyte include $LiClO_4$, $LiPF_6$, $LiBF_4$, $LiCF_3SO_3$, $LiAsF_6$, $LiCl$, $LiBr$, $LiB(C_6H_5)_4$, or $LiN(SO_3CF_3)_2$.

A non-aqueous electrolyte secondary battery can be generally produced by allowing the positive electrode and the negative electrode to be opposite to each other, if necessary, with a separator being interposed therebetween, and immersing them in the electrolytic solution. The separator here used can be a non-woven fabric usually used in a secondary battery, or a liquid-permeable separator made of other porous material. A solid electrolyte made of polymer gel impregnated with the electrolytic solution can also be used instead of the separator or together with the separator.

The carbonaceous material of the present invention is suitable as, for example, a carbonaceous material for a battery (typically a non-aqueous electrolyte secondary battery for driving a vehicle) to be mounted on a vehicle such as an automobile. The vehicle in the present invention can be usually directed to, for example, one known as an electric-powered vehicle, and a hybrid car with a fuel battery and an internal-combustion engine, without any particular limitation, and includes at least a power source apparatus including the battery, an electromotive drive mechanism to be driven by power supply from the power source apparatus, and a control apparatus for controlling it. The vehicle may further include a mechanism including a power generation brake and a regeneration brake, the mechanism converting energy from braking to electricity and charging the energy in the non-aqueous electrolyte secondary battery.

EXAMPLES

Hereinafter, the present invention is specifically described with reference to Examples, but the scope of the present invention is not limited to these Examples. While methods for measuring values of physical properties of the carbonaceous material are hereinafter described, values of physical properties, described in the present specification including Examples, are based on values determined by the following methods.

(1) Measurement and Calculation of Average Particle Size $D_{50}$ and Particle Size Distribution Index $D_{50}/D_{10}$ The average particle sizes $D_{50}$ (particle size distributions) of the carbon precursor and the carbonaceous material were each measured as follows according to a laser scattering method. Each sample of the carbon precursors and the carbonaceous materials prepared in Examples and Comparative Examples described below was loaded into an aqueous solution containing 0.3% by mass of a surfactant ("Toriton X100" manufactured by Wako Pure Chemical Corporation), treated with an ultrasonic washer for 10 minutes or more, and thus dispersed in the aqueous solution. This dispersion liquid was used to measure a particle size distribution. The particle size distribution was measured at a refractive index of solvent of 1.33, with "Particle permeability" being set to "Absorption", by using a particle size/particle size distribution measurement instrument ("Microtrac MT3000" manufactured by Nikkiso Co., Ltd.). The particle size where the cumulative volume reached 50% was defined as the average particle size $D_{50}$.

The particle size where the cumulative volume reached 10% was defined as $D_{10}$, and the particle size distribution index $D_{50}/D_{10}$ was calculated using the following equation.

Particle size distribution index $D_{50}/D_{10}$=Average particle size $D_{50}/D_{10}$ (2) Measurement of BET Specific Surface Area The specific surface areas of the carbonaceous material and the carbon precursor were herein each determined according to a BET method (nitrogen adsorption BET three-point method) (BET specific surface area). The approximate formula derived from the BET equation is represented below.

$$p/[v(p_0-p)]=(1/v_mc)+[(c-1)/v_mc](p/p_0) \qquad \text{[Equation 2]}$$

The approximate formula was used to determine $v_m$ at a temperature of liquid nitrogen according to a three-point method with nitrogen adsorption, and the specific surface area of the sample was calculated by the following equation.

$$\text{Specific surface area}=(v_m\text{Na}/22400)\times10^{-18} \qquad \text{[Equation 3]}$$

Herein, $v_m$ represents the amount of adsorption (cm³/g) necessary for formation of a monomolecular layer on a sample surface, v represents the amount of adsorption (cm³/g) actually measured, $p_0$ represents the saturated vapor pressure, p represents the absolute pressure, c represents the constant number (reflecting heat of adsorption), N represents the Avogadro's number, $6.022\times10^{23}$, and a (nm²) represents the area (molecular occupation cross-sectional area) of an adsorbate molecule occupying the sample surface.

More specifically, for example, the amount of adsorption of nitrogen to the sample at a temperature of liquid nitrogen could be measured with "BELL Sorb Mini" manufactured by Japan BELL. The sample was filled in a sample tube, the sample tube was once depressurized in the state of being cooled to −196° C., and thereafter nitrogen (purity 99.999%) was allowed to adsorb to the sample at a desired relative pressure. The amount of nitrogen adsorbing to the sample at the time of reaching the equilibrium pressure at each desired relative pressure was defined as the amount v of adsorption gas.

(3) Measurement of Aerated Energy AE

Measurement was performed with a powder rheometer FT4 manufactured by Freeman Technology. The carbonaceous material for AE measurement (120 mL) was filled in a measurement container (diameter 50 mm, volume 160 mm³) and leveled, the resultant was installed in the apparatus and subjected to aeration in an amount of aeration of 2 mm/sec from the bottom portion of the apparatus, and a blade (radius: 48 mm) was allowed to progress with rotation at an airfoil tip speed of 100 mm/sec. The helix angle α in movement of the blade tip was here 5°. The movement energy of the blade depending on the blade height was determined according to the following equation:

$$AE=T/(R\tan\alpha)+F$$

and the aerated energy (AE) was calculated.

(4) Average Interplanar Spacing $d_{002}$ of (002) Plane According to X-Ray Diffraction Method An X-ray diffraction pattern was obtained with CuKα ray monochromatized by a Ni filter, as a radiation source, by using a "MiniFlexII manufactured by Rigaku Corporation" and filling a carbonaceous material powder in a sample holder. A peak position in the diffraction pattern was determined according to a centroid method (method involving determining the position of the center of gravity of the diffraction pattern, and determining a peak position at a 2θ value corresponding thereto), and corrected with a diffraction peak of the (111) plane of a high-purity silicon powder for a standard substance. The wavelength λ of the CuKα ray was set to 0.15418 nm, and d002 was calculated by the Bragg's rule (Equation (IV)) described below.

[Equation 4]

$$d_{002}=\lambda/2\cdot\sin\theta \text{ (Bragg's rule)} \qquad \text{(IV)}$$

1. Example 1

(1) Preparation of Carbon Precursor

Preparation Example 1

Gas phase demineralizing: a coconut shell was dry-distilled at 500° C. and then crushed, to thereby obtain coconut shell char having an average particle size of about 2 mm. A heat treatment of 100 g of the coconut shell char with halogen was performed at 900° C. for 30 minutes, with supply of a nitrogen gas containing 1% by volume of a hydrogen chloride gas at a flow rate of 18 L/min thereto. Thereafter, only supply of a hydrogen chloride gas was stopped, and a gas-phase deacidification treatment was performed by an additional heat treatment at 900° C. for 30 minutes with supply of a nitrogen gas at a flow rate of 18 L/min, to thereby obtain a carbon precursor.

(2) Preparation of Carbonaceous Material

Primary pulverization step: the carbon precursor obtained in Preparation Example 1 was pulverized with Fine Mill SF5 (manufactured by NIPPON COKE & ENGINEERING. CO., LTD.) so that the average particle size $D_{50}$ was 4.1 μm.

Classification step: the carbon precursor after primary pulverization was classified with LABO CLASSIEL N-01 (manufactured by SEISHIN ENTERPRISE Co., Ltd.) so that the volume proportion thereof having a size of 1 μm or less was 3.3% by volume.

Secondary pulverization step: the carbon precursor after classification was pulverized with the same Fine Mill SF5 as that used in primary pulverization so that the average particle size $D_{50}$ was 2.8 μm, and thus a carbon precursor was obtained. The $D_{50}/D_{10}$ was here 3.9.

Calcining step: 6.4 g of the carbon precursor prepared above and 0.6 g of polystyrene (manufactured by Sekisui Kasei Co., Ltd., average particle size 400 μm, residual carbon ratio 1.2%) were mixed. A graphite sheath was loaded with 7 g of the mixture so that the height of a sample layer was about 3 mm, and was heated to 1250° C. at a rate of temperature rise of 10° C./min and then retained for 10 minutes and thus naturally cooled, under nitrogen at a flow rate of 6 L/min in a tubular furnace manufactured by MOTOYAMA. The temperature in the furnace was confirmed to be decreased to 200° C. or less, and a carbonaceous material was then taken out from the furnace. The average particle size $D_{50}$, the $D_{50}/D_{10}$, the BET specific surface area, the AE and the average interplanar spacing $d_{002}$ of the carbonaceous material obtained were measured. The results are shown in Table 1.

2. Example 2

Primary pulverization step: the carbon precursor obtained in Preparation Example 1 was pulverized with Fine Mill SF5 (manufactured by NIPPON COKE & ENGINEERING. CO., LTD.) so that the average particle size $D_{50}$ was 8.9 μm.

Classification step: the carbon precursor after primary pulverization was classified with LABO CLASSIEL N-01 (manufactured by SEISHIN ENTERPRISE Co., Ltd.) so that the volume proportion thereof having a size of 1 μm or less was 0% by volume.

Secondary pulverization step: the carbon precursor after classification was pulverized with the same ball mill as that used in primary pulverization so that the average particle size $D_{50}$ was 2.9 μm, and thus a carbon precursor was obtained. The $D_{50}/D_{10}$ was here 3.9.

After the secondary pulverization, a calcining treatment was performed in the same manner as in Example 1, and thus a carbonaceous material was obtained. The average particle size $D_{50}$, the $D_{50}/D_{10}$, the BET specific surface area, the AE and the average interplanar spacing $d_{002}$ of the carbonaceous material obtained were measured. The results are shown in Table 1.

3. Example 3

Primary pulverization step: the carbon precursor obtained in Preparation Example 1 was pulverized with Fine Mill SF5

(manufactured by NIPPON COKE & ENGINEERING. CO., LTD.) so that the average particle size $D_{50}$ was 102 μm.

Classification step: the carbon precursor after primary pulverization was classified with LABO CLASSIEL N-01 (manufactured by SEISHIN ENTERPRISE Co., Ltd.) so that the volume proportion thereof having a size of 1 μm or less was 0% by volume.

Secondary pulverization step: the carbon precursor after classification was pulverized with the same ball mill as that used in primary pulverization so that the average particle size $D_{50}$ was 2.8 μm, and thus a carbon precursor was obtained. The $D_{50}/D_{10}$ was here 3.1.

After the secondary pulverization, a calcining treatment was performed in the same manner as in Example 1, and thus a carbonaceous material was obtained. The average particle size $D_{50}$, the $D_{50}/D_{10}$, the BET specific surface area, the AE and the average interplanar spacing $d_{002}$ of the carbonaceous material obtained were measured. The results are shown in Table 1.

4. Comparative Example 1

The carbon precursor obtained in Preparation Example 1 was pulverized with Fine Mill SF5 (manufactured by NIPPON COKE & ENGINEERING. CO., LTD.) so that the average particle size was 2.5 μm.

Thereafter, neither classification, nor secondary pulverization was performed, and a calcining treatment was performed in the same manner as in Example 1, and thus a carbonaceous material was obtained. The average particle size $D_{50}$, the $D_{50}/D_{10}$, the BET specific surface area, the AE and the average interplanar spacing $d_{002}$ of the carbonaceous material obtained were measured. The results are shown in Table 1.

5. Comparative Example 2

A carbon precursor obtained by the same primary pulverization as in Comparative Example 1 was classified with LABO CLASSIEL N-01 (manufactured by SEISHIN ENTERPRISE Co., Ltd.) so that the volume proportion thereof having a size of 1 μm or less was 6.1% by volume.

Next, the carbon precursor after classification was pulverized with the same ball mill as that used in primary pulverization so that the average particle size $D_{50}$ was 1.4 μm. The $D_{50}/D_{10}$ was here 2.9. After the secondary pulverization, a calcining treatment was performed in the same manner as in Example 1, and thus a carbonaceous material was obtained. The average particle size $D_{50}$, the $D_{50}/D_{10}$, the BET specific surface area, the AE and the average interplanar spacing $d_{002}$ of the carbonaceous material obtained were measured. The results are shown in Table 1.

6. Comparative Example 3

Primary pulverization step: the carbon precursor obtained in Preparation Example 1 was pulverized with Fine Mill SF5 (manufactured by NIPPON COKE & ENGINEERING. CO., LTD.) so that the average particle size $D_{50}$ was 310 μm.

Classification step: the carbon precursor after primary pulverization was classified with LABO CLASSIEL N-01 (manufactured by SEISHIN ENTERPRISE Co., Ltd.) so that the volume proportion thereof having a size of 1 μm or less was 0% by volume.

Secondary pulverization step: the carbon precursor after classification was pulverized with the same ball mill as that used in primary pulverization so that the average particle size $D_{50}$ was 2.6 µm, and thus a carbon precursor was obtained. The $D_{50}/D_{10}$ was here 1.9.

After the secondary pulverization, a calcining treatment was performed in the same manner as in Example 1, and thus a carbonaceous material was obtained. The average particle size $D_{50}$, the $D_{50}/D_{10}$, the BET specific surface area, the AE and the average interplanar spacing $d_{002}$ of the carbonaceous material obtained were measured. The results are shown in Table 1.

7. Comparative Example 4

Primary pulverization step: the carbon precursor obtained in Preparation Example 1 was pulverized with Fine Mill SF5 (manufactured by NIPPON COKE & ENGINEERING. CO., LTD.) so that the average particle size $D_{50}$ was 8.9 µm.

Classification step: the carbon precursor after primary pulverization was classified with LABO CLASSIEL N-01 (manufactured by SEISHIN ENTERPRISE Co., Ltd.) so that the volume proportion thereof having a size of 1 µm or less was 0% by volume.

Thereafter, no secondary pulverization was performed, and a calcining treatment was performed in the same manner as in Example 1, and thus a carbonaceous material was obtained. The average particle size $D_{50}$, the $D_{50}/D_{10}$, the BET specific surface area, the AE and the average interplanar spacing $d_{002}$ of the carbonaceous material obtained were measured. The results are shown in Table 1.

8. Comparative Example 5

Primary pulverization step: the carbon precursor obtained in Preparation Example 1 was pulverized with Fine Mill SF5 (manufactured by NIPPON COKE & ENGINEERING. CO., LTD.) so that the average particle size $D_{50}$ was 25 µm.

Classification step: the carbon precursor after primary pulverization was classified with LABO CLASSIEL N-01 (manufactured by SEISHIN ENTERPRISE Co., Ltd.) so that the volume proportion thereof having a size of 1 µm or less was 0% by volume.

Thereafter, no secondary pulverization was performed, and a calcining treatment was performed in the same manner as in Example 1, and thus a carbonaceous material was obtained. The average particle size $D_{50}$, the $D_{50}/D_{10}$, the BET specific surface area, the AE and the average interplanar spacing $d_{002}$ of the carbonaceous material obtained were measured. The results are shown in Table 1.

9. Comparative Example 6

The carbon precursor obtained in Example 2 was subjected to a classification treatment with LABO CLASSIEL N-01 (manufactured by SEISHIN ENTERPRISE Co., Ltd.) so that the $D_{50}$ was 3.4 µm.

Thereafter, a calcining treatment was performed in the same manner as in Example 1, and thus a carbonaceous material was obtained. The average particle size $D_{50}$, the $D_{50}/D_{10}$, the BET specific surface area, the AE and the average interplanar spacing $d_{002}$ of the carbonaceous material obtained were measured. The results are shown in Table 1.

10. Comparative Example 7

The carbon precursor obtained in Comparative Example 5 was subjected to a classification treatment with LABO CLASSIEL N-01 (manufactured by SEISHIN ENTERPRISE Co., Ltd.) so that the $D_{50}$ was 51.0 µm.

Thereafter, a calcining treatment was performed in the same manner as in Example 1, and thus a carbonaceous material was obtained. The average particle size $D_{50}$, the $D_{50}/D_{10}$, the BET specific surface area, the AE and the average interplanar spacing $d_{002}$ of the carbonaceous material obtained were measured. The results are shown in Table 1.

11. Comparative Example 8

Primary pulverization step: the carbon precursor obtained in Preparation Example 1 was pulverized with Fine Mill SF5 (manufactured by NIPPON COKE & ENGINEERING. CO., LTD.) so that the average particle size $D_{50}$ was 4.1 µm.

Classification step: the carbon precursor after primary pulverization was classified with LABO CLASSIEL N-01 (manufactured by SEISHIN ENTERPRISE Co., Ltd.) so that the volume proportion thereof having a size of 1 µm or less was 3.3% by volume.

Secondary pulverization step: the carbon precursor after classification was pulverized with the same ball mill as that used in primary pulverization so that the average particle size $D_{50}$ was 0.9 µm, and thus a carbon precursor was obtained. The $D_{50}/D_{10}$ was here 2.2.

After the secondary pulverization, a calcining treatment was performed in the same manner as in Example 1, and thus a carbonaceous material was obtained. The average particle size $D_{50}$, the $D_{50}/D_{10}$, the BET specific surface area, the AE and the average interplanar spacing $d_{002}$ of the carbonaceous material obtained were measured. The results are shown in Table 1.

12. Example 4

Blending: the carbon precursor of Example 2 and the carbon precursor of Comparative Example 4 were mixed so that the mass ratio was 1:1, and thus a carbon precursor mixture was obtained.

Polystyrene was added to the obtained carbon precursor mixture and the resultant was subjected to a calcining treatment in the same manner as in Example 1, and thus a carbonaceous material was obtained. The average particle size $D_{50}$, the $D_{50}/D_{10}$, the BET specific surface area, the AE and the average interplanar spacing $d_{002}$ of the carbonaceous material obtained were measured. The results are shown in Table 1.

13. Example 5

Blending: the carbon precursor of Example 2 and the carbon precursor of Comparative Example 5 were mixed so that the mass ratio was 1:1, and thus a carbon precursor mixture was obtained.

Polystyrene was added to the obtained carbon precursor mixture and the resultant was subjected to a calcining treatment in the same manner as in Example 1, and thus a carbonaceous material was obtained. The average particle size $D_{50}$, the $D_{50}/D_{10}$, the BET specific surface area, the AE and the average interplanar spacing $d_{002}$ of the carbonaceous material obtained were measured. The results are shown in Table 1.

14. Example 6

Blending: the carbon precursor of Example 2 and the carbon precursor of Comparative Example 7 were mixed so that the mass ratio was 1:1, and thus a carbon precursor mixture was obtained.

Polystyrene was added to the obtained carbon precursor mixture and the resultant was subjected to a calcining treatment in the same manner as in Example 1, and thus a carbonaceous material was obtained. The average particle size $D_{50}$, the $D_{50}/D_{10}$, the BET specific surface area, the AE and the average interplanar spacing $d_{002}$ of the carbonaceous material obtained were measured. The results are shown in Table 1.

15. Comparative Example 9

Blending: the carbon precursor of Comparative Example 2 and the carbon precursor of Comparative Example 4 were mixed so that the mass ratio was 1:1, and thus a carbon precursor mixture was obtained.

Polystyrene was added to the obtained carbon precursor mixture and the resultant was subjected to a calcining treatment in the same manner as in Example 1, and thus a carbonaceous material was obtained. The average particle size $D_{50}$, the $D_{50}/D_{10}$, the BET specific surface area, the AE and the average interplanar spacing $d_{002}$ of the carbonaceous material obtained were measured. The results are shown in Table 1.

16. Comparative Example 10

Primary pulverization step: the carbon precursor obtained in Preparation Example 1 was pulverized with Fine Mill SF5

(manufactured by SEISHIN ENTERPRISE Co., Ltd.) so that the volume proportion thereof having a size of 1 μm or less was 3.3% by volume.

Secondary pulverization step: the carbon precursor after classification was pulverized with the same ball mill as that used in primary pulverization so that the average particle size $D_{50}$ was 1.2 μm, and thus a carbon precursor was obtained. The $D_{50}/D_{10}$ was here 2.5.

After the secondary pulverization, a calcining treatment was performed in the same manner as in Example 1, and thus a carbonaceous material was obtained. The average particle size $D_{50}$, the $D_{50}/D_{10}$, the BET specific surface area, the AE and the average interplanar spacing $d_{002}$ of the carbonaceous material obtained were measured. The results are shown in Table 1.

17. Example 7

Blending: the carbon precursor of Comparative Example 4 and the carbon precursor of Comparative Example 10 were mixed so that the mass ratio was 55:45, and thus a carbon precursor mixture was obtained.

Polystyrene was added to the carbon precursor mixture obtained and the resultant was subjected to a calcining treatment in the same manner as in Example 1, and thus a carbonaceous material was obtained. The average particle size $D_{50}$, the $D_{50}/D_{10}$, the BET specific surface area, the AE and the average interplanar spacing $d_{002}$ of the carbonaceous material obtained were measured. The results are shown in Table 1.

TABLE 1

| | Pulverization method | | | | Characteristics of carbonaceous material | | | | | |
| | Primary pulverization | Classification Volume proportion | Secondary pulverization | | | | | BET specific surface | | |
| | $D_{50}$ μm | of 1 μm or less % by volume | $D_{50}$ μm | $D_{50}/D_{10}$ | $D_{10}$ μm | $D_{50}$ μm | $D_{50}/D_{10}$ | area m²/g | AE mJ | $d_{002}$ nm |
|---|---|---|---|---|---|---|---|---|---|---|
| Example 1 | 4.1 | 3.3 | 2.8 | 3.9 | 0.7 | 2.8 | 3.9 | 14 | 200 | 0.39 |
| Example 2 | 8.9 | 0 | 2.9 | 3.9 | 0.7 | 2.9 | 3.9 | 11 | 155 | 0.39 |
| Example 3 | 102 | 0 | 2.8 | 3.1 | 0.9 | 2.8 | 3.1 | 10 | 67 | 0.39 |
| Comparative Example 1 | 2.5 | Not performed | Not performed | | 1.3 | 2.5 | 1.9 | 14 | 38 | 0.39 |
| Comparative Example 2 | 2.5 | 6.1 | 1.4 | 2.9 | 0.5 | 1.3 | 2.9 | 53 | 72 | 0.39 |
| Comparative Example 3 | 310 | 0 | 2.6 | 1.9 | 1.4 | 2.6 | 1.9 | 15 | 37 | 0.39 |
| Comparative Example 4 | 8.9 | 0 | Not performed | | 3.8 | 8.6 | 2.3 | 4 | 22 | 0.39 |
| Comparative Example 5 | 25 | 0 | Not performed | | 5.6 | 20 | 3.6 | 3 | 6 | 0.39 |
| Comparative Example 6 | Classification treatment of carbon precursor obtained in Example 2 | | | | 1.9 | 3.3 | 1.7 | 7 | 36 | 0.39 |
| Comparative Example 7 | Classification treatment of carbon precursor obtained in Comparative Example 5 | | | | 28.9 | 50.9 | 1.8 | 2 | 31 | 0.39 |
| Comparative Example 8 | 4.1 | 3.3 | 0.9 | 2.2 | 0.4 | 0.9 | 2.2 | 100 | 86 | 0.39 |
| Example 4 | Blend of Example 2 and Comparative Example 4 at 1:1 (mass ratio) | | | | 1.6 | 4.6 | 2.8 | 7 | 71 | 0.39 |
| Example 5 | Blend of Example 2 and Comparative Example 5 at 1:1 (mass ratio) | | | | 1.4 | 5.6 | 3.9 | 5 | 66 | 0.39 |
| Example 6 | Blend of Example 2 and Comparative Example 7 at 1:1 (mass ratio) | | | | 1.3 | 5.4 | 4.2 | 5 | 65 | 0.39 |
| Comparative Example 9 | Blend of Comparative Example 2 and Comparative Example 4 at 1:1 (mass ratio) | | | | 1.2 | 3.3 | 2.8 | 28 | 210 | 0.39 |
| Comparative Example 10 | 4.1 | 3.3 | 1.2 | 2.5 | 0.5 | 1.2 | 2.5 | 44 | 230 | 0.39 |
| Example 7 | Blend of Comparative Example 4 and Comparative Example 10 at 55:45 (mass ratio) | | | | 0.6 | 5.2 | 8.7 | 22 | 205 | 0.39 |

(manufactured by NIPPON COKE & ENGINEERING. CO., LTD.) so that the average particle size $D_{50}$ was 4.1 μm.

Classification step: the carbon precursor after primary pulverization was classified with LABO CLASSIEL N-01

The carbonaceous materials obtained in Examples and Comparative Examples were used and battery characteristics were evaluated according to the following methods. Each result is shown in Table 2.

<Production of Electrode and Observation of State of Electrode>

A slurry was obtained by mixing 96.2 parts by mass of each of the carbonaceous materials obtained in Examples or Comparative Examples, 2 parts by mass of conductivity carbon black ("Super-P (registered trademark)" manufactured by TIMCAL Ltd.), 1 part by mass of CMC, 0.8 parts by mass of SBR and water. Each copper foil was coated with the obtained slurry, and the resultant was dried and then pressed, to thereby obtain a negative electrode (negative electrode layer).

<Electrode Density>

The thickness of the negative electrode layer was determined as the numerical value obtained by measuring the thickness of the negative electrode layer produced, with a micrometer, and then subtracting the thickness of the current collector plate therefrom.

The electrode density ($g/cm^3$) was determined as the numerical value ($g/cm^3$) obtained by dividing the mass (g) of the carbonaceous material mixed in the slurry in production of the negative electrode layer, by the volume ($cm^3$) of the negative electrode layer produced. The volume of the A lithium-ion secondary battery having the above-mentioned configuration was subjected to a charge-discharge test with a charge-discharge test apparatus ("TOSCAT" manufactured by TOYO SYSTEM CO., LTD.). The initial direct-current resistance was defined as the resistance value generated in application of direct-current at 0.5 mA for 3 seconds. Doping with lithium was performed at a rate of 70 mA/g relative to the mass of the active material, and the doping was performed until 1 mV relative to the potential of lithium was achieved. A constant voltage of 1 mV relative to the potential of lithium was applied for 8 hours, and the doping was terminated. The capacity (mAh/g) here was defined as the charge capacity. Next, undoping was performed at a rate of 70 mA/g relative to the mass of the active material until 2.5 V relative to the potential of lithium was achieved, and the capacity for discharging here was defined as the discharge capacity. The product of multiplying the discharge capacity and the electrode density was defined as the volumetric capacity. The percentage of Discharge capacity/Charge capacity was defined as the charge-discharge efficiency, and was adopted as an index of utilization efficiency of a lithium ion in a battery.

TABLE 2

| | | Evaluation of battery | | | | |
|---|---|---|---|---|---|---|
| | State of electrode | Electrode density A g/cc | Charge capacity B mAh/g | Discharge capacity C mAh/g | Volumetric capacity A × C mAh/cc | Charge/discharge efficiency C/B × 100 % |
| Example 1 | ○ | 1.07 | 498 | 406 | 434 | 81.5% |
| Example 2 | ○ | 1.03 | 492 | 407 | 419 | 82.7% |
| Example 3 | ○ | 1.02 | 491 | 408 | 416 | 83.1% |
| Comparative Example 1 | ○ | 0.99 | 487 | 399 | 395 | 81.9% |
| Comparative Example 2 | ○ | 1.05 | 486 | 365 | 390 | 75.1% |
| Comparative Example 3 | ○ | 0.99 | 489 | 400 | 396 | 81.8% |
| Comparative Example 4 | ○ | 0.96 | 472 | 407 | 391 | 86.2% |
| Comparative Example 5 | ○ | 0.97 | 456 | 397 | 385 | 87.0% |
| Comparative Example 6 | ○ | 0.96 | 487 | 407 | 389 | 83.6% |
| Comparative Example 7 | ○ | 0.90 | 456 | 397 | 358 | 87.0% |
| Comparative Example 8 | X (Incapable of forming electrode) | — | — | — | — | — |
| Example 4 | ○ | 1.04 | 480 | 405 | 421 | 84.4% |
| Example 5 | ○ | 1.01 | 472 | 407 | 411 | 86.2% |
| Example 6 | ○ | 1.00 | 471 | 407 | 407 | 86.4% |
| Comparative Example 9 | ○ | 1.08 | 483 | 385 | 416 | 79.7% |
| Comparative Example 10 | ○ | 1.13 | 482 | 378 | 427 | 78.4% |
| Example 7 | ○ | 1.18 | 495 | 399 | 471 | 80.6% | negative electrode layer was calculated using the thickness of the negative electrode layer and the diameter (14 mm) of the negative electrode layer. In a case where an evaluable electrode could be produced, the electrode state was rated as "○", and in a case where an unevaluable electrode was produced due to the occurrence of clumping, bubbles, dropping of the negative electrode layer, or the like, the electrode state was rated as "x".

<Measurement of Charge Capacity, Discharge Capacity, Charge-Discharge Efficiency and Initial Direct-Current Resistance>

Each of the electrodes produced above was adopted as a working electrode, and metallic lithium was used for a counter electrode and a reference electrode. A mixture of ethylene carbonate and methyl ethyl carbonate (volume ratio 3:7) was used as a solvent. In the solvent was dissolved 1 mol/L of $LiPF_6$, and the resultant was used as an electrolyte. A non-woven glass fiber was used as a separator. Each coin cell was produced in a glove box under an argon atmosphere.

The invention claimed is:

1. A carbonaceous material for an electrochemical device, having a specific surface area of 18 $m^2/g$ or less as measured according to a BET method, an aerated energy of 40 mJ or more and 210 mJ or less as measured with a powder rheometer, an average particle size $D_{50}$, where a cumulative volume from a fine particle side in a particle size distribution measured according to a laser scattering method reaches 50%, of 1 μm or more and 50 μm or less, and a particle size distribution index $D_{50}/D_{10}$, which is a ratio of the average particle size $D_{50}$ to a particle size $D_{10}$ where the cumulative volume from the fine particle side reaches 10%, of 1.9 or more.

2. The carbonaceous material according to claim 1, wherein an average interplanar spacing $d_{002}$ of the (002) plane, calculated using the Bragg equation according to a wide-angle X-ray diffraction method, is 0.36 nm or more.

3. The carbonaceous material according to claim 1, wherein the carbonaceous material is derived from a plant.

4. A negative electrode for an electrochemical device, comprising the carbonaceous material according to claim 1.

5. An electrochemical device, comprising the negative electrode for an electrochemical device according to claim 4.

6. A method for producing a carbonaceous material, the method comprising:

subjecting a carbon precursor or the like to primary pulverization;

classifying the carbon precursor or the like after the primary pulverization; and subjecting the carbon precursor or the like after the classification to secondary pulverization, wherein the carbon precursor or the like is a carbon precursor or a carbon precursor-calcined product and the carbonaceous material produced by the method is the carbonaceous material according to claim 1.

7. The method according to claim 6, wherein the carbon precursor or the like is pulverized in the primary pulveriza-tion so that an average particle size $D_{50}$ is 2.7 μm or more and 300 μm or less.

8. The method according to claim 6, wherein the carbon precursor or the like after the primary pulverization is classified in the classification so that a content ratio of a particle having a size of 1 μm or less is 6% by volume or less.

9. The method according to claim 6, wherein the carbon precursor or the like after the classification is pulverized in the secondary pulverization so as to obtain the carbonaceous material having the average particle size $D_{50}$ and the particle size distribution index $D_{50}/D_{10}$.

10. The method according to claim 6, wherein the carbon precursor or the like is a carbon precursor and the method further comprises calcining the carbon precursor after the secondary pulverization.

11. The method according to claim 6, wherein the carbon precursor or the like is a carbon precursor-calcined product obtained by calcining a carbon precursor.

* * * * *